UNITED STATES PATENT OFFICE.

JOHN H. STEVENS, OF NEWARK, NEW JERSEY, ASSIGNOR TO THE CELLULOID MANUFACTURING COMPANY, OF NEW YORK.

FACTITIOUS LITHOGRAPHIC STONE.

SPECIFICATION forming part of Letters Patent No. 556,380, dated March 17, 1896.

Application filed February 1, 1888. Serial No. 262,656. (No specimens.)

*To all whom it may concern:*

Be it known that I, JOHN H. STEVENS, a citizen of the United States, and a resident of Newark, in the county of Essex and State of New Jersey, have invented a new and useful Improvement in Treating Surfaces of Pyroxyline Compounds, Materials, or Substances for Use in Lithographic Printing, of which the following is a specification.

This invention relates to improvements in lithographic printing in which celluloid or any similar material or substance containing nitrocellulose as a base is substitued for the ordinary lithographic stone, and wherever the word "celluloid" is used in this specification I refer to pyroxyline compounds, materials or substances now well known and of which "celluloid" is the best-known name. By the word "similar" I do not mean manufactured by the same process, but similar in containing nitrocellulose as a base and solid and homogeneous in structure.

I am well aware that it has been proposed to use celluloid for this purpose; but the ordinary celluloid, while it is said to answer the purpose to some extent, I have found not at all satisfactory, and it is, therefore, the object of my invention to so prepare the celluloid surface as to remedy the difficulties which I have heretofore met in the use of the ordinary celluloid.

The art of lithography and the nature of the stones used being well understood, it is unnecessary to describe the ordinary process used with lithographic stones. It is sufficient to say that the surface of the stone from which the impressions are taken must necessarily possess such an affinity for water that the parts unaffected by the greasy design to be printed will retain enough moisture after a wet sponge or dampening-roller is passed over the surface to effectually repel the ink during the inking process, and thereby confine it to the design.

My process contemplates so changing the surface of a celluloid plate that it will resemble the Solenhofen lithographic stone in its water-absorbing properties. I prefer to use that variety of celluloid which contains a large proportion of some substance which will assist the material in absorbing water. Good examples of such substances are whiting, chalk, terra-alba, barytes, and the clay commonly used by paper-makers as an adulterant called "paper-clay." Paper-clay is preferred by me to all other substances for this purpose, because of its cheapness and its possessing smoothness and freedom from grit, and because it is an excellent water-absorbent when combined with the celluloid.

The celluloid may contain from one-half to two times as much clay (which I have found to produce the best results) as pyroxyline, or as large an amount as will combine with the material without making it too brittle for use; but I do not confine myself to the use of an adulterated pyroxyline material, for the use of a pure pyroxyline would be within my invention. The celluloid plate should be formed of a sheet of well dried or seasoned materal, about three-sixteenths of an inch thick, attached to an iron base of sufficient strength to impart rigidity to the whole; but my invention is not confined to celluloid or pyroxyline plate of any specific thickness or attached in any specific way to the base, (if such base be used,) or a base of any specific material, or a plate formed by any specific means.

The particular strength or variety of the sulphuret of potassium must also be taken into consideration, for it will be found that the products of different manufacturers vary considerably—at least, such has been my experience—and I prefer to use the lightest-colored kind, which I have found to possess the greatest strength, and therefore to be the most economical. In practicing this invention it is best to adopt some one variety of sulphuret of potassium made by responsible manufacturers and ascertain its strength by testing a small plate.

In view of the facts just stated it is evident that the operator might be compelled to depart somewhat from the proportions of the following surface solutions, which I have found to produce excellent work of the second class, above spoken of, namely: eight fluid ounces of solution No. 1, two fluid ounces of solution No. 2, and four fluid ounces of solution No. 3. This mixture is to be well compounded and strained. This mixture I use for ten minutes' contact. A longer time requires a weaker solution and a shorter time a stronger solution. After removing this solution, which can be done with water and a soft sponge, the design is washed out with turpentine and rolled with ink in the usual way. In case the design prints too heavy or the plate smears easily it should be treated again as above with the surface solution, in all of which the operator's experience with the ordinary stone will be his best guide.

The purpose of using the surface solution which I have given is to so affect the celluloid on all that portion of the plate unprotected by the design that it will absorb water and repel ink. This results in rendering the celluloid surface capable of retaining enough moisture when a wet sponge or dampening-roller is passed over the surface to keep the plate from taking ink on those portions of the surface which do not have the design upon them.

I have found that sulphuric acid in certain strengths may also be used instead of sulphuret of potassium, and in fact any equivalent substances which will make the celluloid capable of absorbing water will answer more or less well; but the action of such substances is not so easily controlled, and therefore I prefer and recommend sulphuret of potassium for this purpose. I am aware that sulphuric acid, very much diluted, has been proposed to be used upon real lithographic stones; but such solutions are not efficient for celluloid, and only sulphuric acid of very much greater strength than has ever to my knowledge been used on real lithographic stones is useful with celluloid. The sulphuric acid for celluloid should have a strength of, say, from 1.45° specific gravity to 1.84° specific gravity.

The gum-arabic is used for the purpose of making the solution of the proper consistency. Other substances may be substituted in its stead—for instance, sugar, gelatine, glue, gum tragacanth, albumen, mucilage, or eggs. When eggs are used, no soap will be required in the solution, for eggs, as is well known, are of a soapy nature. The soap keeps the solution from blistering or separating, to which it is extremely liable, especially when impure water is used, and the result of any opening in the surface solution caused by such separation is to expose the plate at such points and cause the work to come up spotted on the parts which are uncovered, and consequently unaffected by the solution.

The celluloid surface is ground down perfectly level, and the nature of the surface, whether grained or otherwise, is determined, as in the case of ordinary lithographic stones, by the character of the work to be performed.

The same precautions in regard to keeping the surface of the stone perfectly clean and free from scratches which are observed in the ordinary stonework are equally applicable to celluloid plates.

My process contemplates the treatment of the celluloid surface composed as above with a solution composed of a mixture of the following solutions:

No. 1. Water, one pound; powdered gum-arabic, one pound.

No. 2. Water, one pound; sulphuret of potassium, one pound.

No. 3. Water, six pounds; castile-soap, one pound.

Solution No. 1 is made by thoroughly mixing the water and gum-arabic and allowing the mixture to stand over night. It must not be kept too long, as it readily turns sour. This can be prevented by combining a small proportion of carbolic acid with the solution; but it is better to use only fresh mixtures.

In solution No. 2 the sulphuret of potassium is dissolved in the water and allowed to settle, and the clear portion poured off to be used. It is better to keep this solution in a dark glass bottle excluded from strong light. It cannot be kept long, for it slowly decomposes and becomes weak.

Solution No. 3 is made by cutting the soap into small pieces and dissolving in the water by the aid of heat.

In lithography there are two general styles of work done upon the stone, namely: first, cutting the design into the surface or engraving; second, applying the design in ink to the surface of the stone, which includes crayon, stipple-pen work and transferring.

To prepare the celluloid plate for engraving the surface is polished and a mixture of the following solution spread upon it with a soft brush: one fluid ounce of solution No. 1, one fluid ounce of solution No. 2, and one fluid ounce of solution No. 3. This and all other surface mixtures must be strained through coarse linen or cheese-cloth before being used. After a contact of ten minutes the solution is washed off and the surface is ready for engraving. The engraved surface can then be inked and the impressions taken in the usual manner.

In the second class of work the design is either drawn or transferred upon the surface in the ordinary way and dusted with gum-asphaltum or other suitable protective powder for the work. The surface is then brushed with a weaker mixture of solutions Nos. 1, 2, and 3 than above given. By a "weaker mixture" is meant one containing less of solution No. 2, for this is the active agent which affects the surface of the celluloid, and when the action is too powerful the design is eaten away.

The proper strength of solution to prepare the celluloid surface without destroying the work is rather a matter of judgment with the operator, and it resembles in this respect the nitric-acid solution used on the stone in the ordinary process.

Castile soap is recommended to be used; but any kind of soap accomplishes the result, or in fact anything which will form a soap when mixed with the solution, or anything of a soapy nature. Eggs and common rosin are good examples of such substances, as both will effectually prevent the solutions from separating or opening on the plate, the rosin by means of its ability to form a rosin soap with the potash in the mixture and the eggs by reason of their soapy nature.

The plate can be prepared with a simple solution of sulphuret of potassium in water; but this method is not so convenient as the one which I have recommended, for it is better to have the solution of such a consistency that it can be applied with a brush, and only the finest camel's-hair or similar soft brush should be used.

In case it is desired to use sulphuric acid to prepare the plate it will be found best to thicken the acid by dissolving cotton in moderately weak acid, for sulphuric acid cannot be used with gum-arabic or with soap.

The solution must be spread on the plate quickly and without much friction, as too much friction will cause the design to be eaten or damaged. The coating should be sufficiently thick to well cover the surface—say about one thirty-second of an inch deep.

Of course I do not limit myself to the use of the substances specified in solution, for my invention would include a treatment in which the substances applied to the pyroxyline surface, in accordance with my invention, are of a thicker consistency, such as a paste.

Instead of sulphuret of potassium, I may employ other substances having the capacity of acting upon the pyroxyline surface in a similar manner—such as sulphocyanide of potassium, sulphide of sodium, chromic acid, peroxide of barium, &c.

What I claim, and desire to secure by Letters Patent, is—

1. The method of preparing the lithographic surface of pyroxyline compounds or materials, which consists in treating such surface with a material which will render it capable of retaining an ink-repelling liquid, substantially as set forth.

2. The method of preparing the lithographic surface of pyroxyline compounds or materials, which consists in treating such surface with sulphuret of potassium, substantially as set forth.

3. The method of preparing the lithographic surface of pyroxyline compounds or materials, which consists in treating such surface with sulphuret of potassium and a soapy substance, substantially as set forth.

4. The method of preparing the lithographic printing-surface of pyroxyline compounds or materials, which consists in treating such surface with sulphuret of potassium, gum-arabic and a soapy substance, substantially as herein set forth.

5. As a new article of manufacture, a factitious lithographic plate composed of a compound of pyroxyline having its surface treated, substantially as described, so as to render it capable of retaining an ink-repelling liquid.

JOHN H. STEVENS.

Witnesses:
CHAS. G. F. WAHLE, Jr.,
HENRY E. EVERDING.